United States Patent Office 3,320,219
Patented May 16, 1967

3,320,219
VULCANIZATION PROCESS
Alan Dibbo, Chalfont St. Peter, England, and Ernest Bryson McCall, Llangollen, Wales, assignors to Monsanto Chemicals Limited, London, England, a British company
No Drawing. Filed Aug. 1, 1963, Ser. No. 299,150
Claims priority, application Great Britain, Aug. 9, 1962, 30,550/62
9 Claims. (Cl. 260—79.5)

This invention relates to a novel process for the vulcanization of rubber.

The most widely used rubbers such as for instance natural rubber and the styrene-butadiene synthetic rubbers are commonly vulcanized by heating with sulfur or a sulfur-containing vulcanizing agent. It is an established procedure to incorporate in the rubber prior to vulcanization a material that will increase the rate of vulcanization, and several types of chemical compound having vulcanization accelerator properties are known.

In certain circumstances more than one accelerator may be used in vulcanizing rubber; for example where one accelerator when used alone gives a satisfactory vulcanizate but a relatively slow rate of cure, it has been proposed to use in appropriate instances a secondary accelerator in conjunction with the first to increase the rate of cure.

We have now found that methylenebis(aliphatic-oxyanilines) are vulcanization accelerators and are especially useful as secondary accelerators.

The invention accordingly comprises a process for the vulcanization of a sulfur-vulcanizable rubber, in which a methylenebis(aliphatic-oxyaniline) is incorporated in the rubber together with sulfur or a sulfur-containing vulcanizing agent, and the mixture is heated to effect vulcanization.

Certain of the methylenebis(aliphatic-oxyanilines) are new chemical compounds. There are the 3,3'-methylenebis-(4-aliphatic-oxyanilines) in which each 4-aliphatic-oxy group contains 3 or more carbon atoms.

Also part of the invention is a composition comprising an unvulcanized sulfur-vulcanizable rubber, and a methylenebis(aliphatic-oxyaniline).

In a preferred embodiment of the process, the methylenebis(aliphatic-oxyaniline) is used as a secondary accelerator in conjunction with a primary accelerator selected from the thiazole class of accelerators, which is also incorporated in the rubber prior to vulcanization.

The invention also includes a mixture comprising a methylenebis(aliphatic-oxyaniline) and a thiazole accelerator.

The methylenebis(aliphatic-oxyaniline) is a compound in which two aniline nuclei each carrying an aliphatic-oxy substituent are bridged by a methylene group. A typical compound is for instance 3,3'-methylenebis(4-ethoxyaniline). Optionally one or both aniline nuclei can contain a further substituent such as for instance an alkyl group.

In the methylenebis(aliphatic-oxyaniline) the aliphatic-oxy group can be for example an alkoxy group having either a straight or branched chain such as for instance a methoxy, ethoxy, n-butoxy, isobutoxy, hexyloxy, heptyloxy or decyloxy group, an alkoxyalkoxy group, such as an ethoxyethoxy group, an alkenyloxy group, such as an allyloxy group, a cycloalkoxy group, such as a cyclohexyl-oxy group, or an aralkoxy group, such as a benzyloxy group. In preferred methylenebis(aliphatic-oxyanilines) the aliphatic-oxy group is usually an alkoxy group.

An amino group in the methylenebis(aliphatic-oxyaniline) is often preferably a primary amino group, but it can be a secondary or tertiary amino group in which the group or groups replacing the hydrogen of a primary amino group are aliphatic, for example an alkyl group such as for instance a methyl or ethyl group, a cycloalkyl group such as for instance a cyclohexyl group, an aralkyl group such as for instance a benzyl group, or a saturated group that forms a ring with the nitrogen atom such as for instance a cyclopentamethylene or cyclotetramethylene group.

A preferred class of methylenebis(aliphatic-oxyanilines) are methylenebis(alkoxyanilines) where the aniline nuclei are bridged by the methylene group at the 3-positions relative to the amino group. In this class, compounds that are particularly useful in the vulcanization of rubber have the alkoxy group in the 4-position relative to the amino group in each aniline nucleus.

In the new 3,3'-methylenebis(4-aliphatic-oxyanilines), the aliphatic-oxy groups can for instance be selected from any of those exemplified above with reference to the general class of methylenebis(aliphatic-oxyanilines) that can be used as vulcanization accelerators and that contain 3 or more carbon atoms. The new compounds include members where each aniline nucleus has an alkyl substituent, for example a methyl or ethyl group.

Specific examples of the new 3,3'-methylenebis-(4-aliphatic-oxyanilines) are:

3,3'-methylenebis(4-isopropoxy-aniline);
3,3'-methylenebis(4-n-butoxyaniline);
3,3'-methylenebis(4-n-butoxy-5-methylaniline);
3,3'-methylenebis(4-n-heptyloxy-aniline);
3,3'-methylenebis(4-n-decyloxyaniline);
3,3'-methylenebis(4-β-ethoxyethoxyaniline);
3,3'-methylenebis(4-cyclohexyloxyaniline); and
3,3'-methylenebis(4-benzyloxyaniline).

Examples of other methylenebis(aliphatic-oxyanilines) that can be used in the vulcanization of rubber are:

3,3'-methylenebis(2-ethoxyaniline);
3,3'-methylenebis(4-methoxyaniline);
3,3'-methylenebis(4-ethoxyaniline);
3,3'-methylenebis(4-ethoxy-6-methylaniline);
3,3'-methylenebis(4-ethoxy-N-methylaniline);
4,4'-methylenebis(2-methoxyaniline); and
4,4'-methylenebis(2-ethoxyaniline).

The methylenebis(aliphatic-oxyanilines) can be prepared by a number of routes, for example the condensation of an aliphatic-oxyaniline with formaldehyde; the condensation of an aliphatic-oxy nitrobenzene wth formaldehyde or the condensation of an aliphatic-oxy nitrobenzyl chloride with an aliphatic-oxy-nitrobenzene to give in each case an intermediate from which the methylenebis(aliphatic-oxyaniline) can be obtained on reduction.

A preferred method for the production of a new 3,3'-methylenebis(4-aliphatic-oxyaniline) comprises the condensation of an appropriate 4-aliphatic-oxyaniline with formaldehyde (often conveniently employed in the form of a precursor such as paraformaldehyde) in the presence of an acid catalyst. In practice, concentrated sulfuric acid, optionally containing a proportion of acetic acid, is advantageously employed as the medium in which the condensation is carried out. It is preferable to use at least 2 molar proportions of the aliphatic-oxyaniline to each molar proportion of formaldehyde and to carry out the condensation at a relatively low temperature, for example one not exceeding 50° C.

The methylenebis(aliphatic-oxyanilines) can be used in the vulcanization of natural rubber and the sulfur-vulcanizable synthetic rubbers. Such synthetic rubbers include polymers of 1,3-butadiene, for instance of 1,3-butadiene itself and of isoprene, and copolymers of 1,3-butadiene with other monomers, such as styrene, acrylonitrile, isobutylene or methyl methacrylate.

Where a methylenebis(aliphatic-oxyaniline) is used for vulcanizing rubber in conjunction with a thiazole accelerator, the latter can be for instance 2-mercaptobenzothiazole, 2-benzothiazyl disulfide, zinc 2-mercaptobenzothiazole, 2, 4-dinitrophenylbenzothiazyl sulfide or a benzothiazylsulfenamide, for example 2(morpholinothio)benzothiazole, N-cyclohexyl benzothiazyl-2-sulfenamide or N-tert.-butyl benzothiazyl-2-sulfenamide.

In the mixtures comprising a methylenbis(aliphatic-oxyaniline) and a thiazole accelerator that form part of the invention, the thiazole accelerator can be one of those exemplified above.

The amount of sulfur or sulfur-containing vulcanizing agent employed in the vulcanization process of the present invention can be that conventionally employed in the vulcanization of the particular rubber concerned, and is usually from about 0.5 to about 5 parts by weight per hundred parts by weight of rubber. Sulfur-containing vulcanizing agents that can be employed include for instance amine disulfides and thiuram disulfides.

Where a methylenebis(aliphatic-oxyaniline) is used as a vulcanization accelerator in the absence of a thiazole accelerator, it is preferable to incorporate into the rubber 1 part or more by weight per hundred parts by weight of rubber. In the preferred process where the methylenebis(aliphatic-oxyaniline) is used as a secondary accelerator in conjunction with a thiazole primary accelerator, the amounts of each used will depend on a number of factors, including for instance the type of rubber to be vulcanized and the use for which the vulcanized rubber is required. Generally, however, from about 0.1 to about 1.0 part by weight of the methylenebis(aliphatic-oxyaniline) and from about 0.2 to about 2 parts by weight of the thiazole accelerator per hundred parts by weight of rubber are satisfactory, although amounts outside these limits can be used if desired. Typical quantities, in parts by weight of the methylenebis(aliphatic-oxyaniline) and the thiazole accelerator respectively per hundreds parts by weight of rubber, are for example:

In a natural rubber tire tread stock, 0.5 and 0.5;
In a styrene-butadiene rubber tire tread stock, from 0.25 to 0.5 and from 1.5 to 1.0;
In a soling compound, 0.5 and 2.0;
In a mechanical rubber stock, 0.5 and 0.7.

A mixture of the invention will normally contain the methylenebis(aliphatic-oxyaniline) and the thiazole accelerator in the same proportions as they are used in rubber, as indicated above.

Compounding of the rubber prior to vulcanization can be carried out by conventional means, using for example a roll mill or an internal mixer. Normally other commonly used ingredients, such as for instance zinc oxide, stearic acid, a filler and an antioxidant will also be incorporated into the rubber prior to vulcanization. The vulcanization proper, in which the compounded mixture is heated, is carried out at a temperature appropriate to the particular rubber concerned, for example at a temperature of about 135–155° C. where the composition is based on natural rubber, or at a temperature of about 140–160° C. where the composition is based on a styrene-butadiene rubber.

The invention is illustrated by the following examples:

*Example 1*

This example describes tests used in making a preliminary assessment of the accelerator properties of a test compound, and gives the results obtained with two methylenebis(ethoxyanilines) showing that each accelerated the vulcanization of a white rubber stock.

The following mixes were prepared by compounding on a mill. The figures indicate parts by weight.

|  | Mix A | Control Mix A | Mix B | Control Mix B |
|---|---|---|---|---|
| Pale crepe | 100 | 100 | 100 | 100 |
| Zinc oxide | 3 | 3 | 3 | 3 |
| Stearic acid | 1 | 1 | 1 | 1 |
| Sulfur | 2.5 | 2.5 | 2.5 | 2.5 |
| 3,3'-methylenebis (2-ethoxyaniline) | 1.5 | | | |
| 3,3'-methylenebis (4-ethoxyaniline) | | | 1.5 | |

Each mix was allowed to stand for 24 hours before being tested.

In one test method, a 50 gram sample of the mix under test was placed in a Mooney plastometer fitted with a "large" rotor, according to British Standard Specification No. 1673, Part 3, 1951. The time taken for the reading of the instrument to increase to 100 units at a temperature of 140°±1° C. was recorded, this time being inversely related to the accelerator activity of the compound under test.

In a second test method, the degree of vulcanization of a mix after various cure times at 160° C. was determined by measuring the extent to which a cured sample swelled on immersion in benzene for 24 hours at room temperature, the extent of swelling being inversely proportional to the degree of vulcanization. The procedure was that of British Standard Specification 903, Part A16, Method C, using strips cured in 1 mm. x ½ inch x 4 inch moulds.

The results given in the table below show that the rubber mixes containing the methylenebis(ethoxyanilines) vulcanized more rapidly than the controls.

| Mix | Mooney Plastometer Time to reach 100 Units (minutes) | Percent Linear Swelling in Benzene Cure time (minutes) | | |
|---|---|---|---|---|
|  |  | 7.5 | 15 | 30 |
| A |  | 101 | 89 | 82 |
| Control A |  | 149 | 145 | 115 |
| B | 12 | 83 | 75 | 82 |
| Control B | 120 | >150 | 120 | 110 |

*Example 2*

This example gives the results obtained in the testing of further methylenebis(alkoxyanilines), namely 3,3'-methylenebis(6-ethoxyaniline) and 3,3'-methylenebis(4-n-heptyloxyaniline), by the methods described in Example 1.

The mixes used had the following compositions. The figures indicate parts by weight.

|  | Mix G | Control Mix G | Mix H | Control Mix H |
|---|---|---|---|---|
| Pale crepe | 100 | 100 | 100 | 100 |
| Zinc oxide | 3 | 3 | 3 | 3 |
| Stearic acid | 1 | 1 | 1 | 1 |
| Sulfur | 2.5 | 2.5 | 2.5 | 2.5 |
| 3,3'-methylenebis(6-ethoxyaniline) | 1.5 | | | |
| 3,3'-methylenebis(4-n-heptyloxyaniline) | | | 1.5 | |

The results were as follows:

| Mix | Mooney Plastometer Time to reach 100 Units (minutes) | Percent Linear Swelling in Benzene Cure time (minutes) | | |
|---|---|---|---|---|
| | | 7.5 | 15 | 30 |
| G | 36 | 127 | 98 | 84 |
| Control G | 120 | >150 | 130 | 110 |
| H | 15¼ | 79 | 75 | 76 |
| Control H | 120 | >150 | 120 | 105 |

The results show that the rubber mixes containing the methylenebis(alkoxyanilines) vulcanized more rapidly than the controls, and that the methylenebis(alkoxyanilines) were therefore effective accelerators.

*Example 3*

The example illustrates the use of 3,3'-methylenebis(4-ethoxyaniline) as a secondary accelerator with N-cyclohexyl-3-benzothiazylsulfenamide as the primary accelerator in a natural rubber tire tread stock.

The following mixes were prepared by compounding on a mill. The figures indicate parts by weight.

| | Mix C | Mix D |
|---|---|---|
| Smoked sheet | 100 | 100 |
| Zinc oxide | 5 | 5 |
| Stearic acid | 3 | 3 |
| High abrasion furnace black | 50 | 50 |
| Sulfur | 2.5 | 2.5 |
| N-cyclohexyl-2-benzothiazylsulfenamide | 0.5 | 0.5 |
| 3,3'-methylenebis(4-ethoxyaniline) | | 0.5 |

Samples of each mix were cured by heating at 148° C. for various lengths of time, and on testing by standard methods the vulcanizates were found to have the following properties:

| | Cure Time (minutes) | Mix C | Mix D |
|---|---|---|---|
| Tensile Strength (Kg./sq. cm.) | 5 | 188 | 215 |
| | 10 | 240 | 261 |
| | 20 | 240 | 253 |
| | 40 | 237 | 236 |
| Elongation at Break (percent) | 5 | 560 | 470 |
| | 10 | 500 | 450 |
| | 20 | 450 | 400 |
| | 40 | 440 | 390 |
| Modulus at 300% Elongation (Kg./sq. cm.) | 5 | 80 | 117 |
| | 10 | 126 | 183 |
| | 20 | 160 | 188 |
| | 40 | 154 | 193 |

The figures show that both mixes gave good quality vulcanizates but that Mix D containing the methylenebis(ethoxyaniline) had a shorter optimum cure time and the vulcanizate had better physical properties than the vulcanizate from Mix C.

*Example 4*

This example illustrates the use of 3,3'-methylenebis(4-ethoxyaniline) as a secondary accelerator with N-cyclohexyl-2-benzothiazylsulfenamide as the primary accelerator in a styrene-butadiene synthetic rubber tire tread stock, in comparison with an established secondary accelerator, diphenylguanidine.

The following mixes were prepared by compounding on a mill. The figures indicate parts by weight.

| | Mix E | Mix F |
|---|---|---|
| Styrene-butadiene rubber | 100 | 100 |
| Zinc oxide | 4 | 4 |
| Stearic acid | 2 | 2 |
| Process oil | 8 | 8 |
| High abrasion furnace black | 50 | 50 |
| Sulfur | 1.75 | 1.75 |
| N-cyclohexyl-2-benzothiazylsulfenamide | 1.0 | 1.0 |
| Diphenylguanidine | 0.5 | |
| 3,3'-methylenebis(4-ethoxyaniline) | | 0.5 |

Samples of each mix were cured by heating at 153° C. for various length of time, and on testing by standard methods, the vulcanizates were found to have the following properties:

| | Cure Time (minutes) | Mix E | Mix F |
|---|---|---|---|
| Tensile Strength (Kg./sq. cm.) | 10 | 170 | 174 |
| | 20 | 173 | 178 |
| | 30 | 170 | 177 |
| | 40 | 172 | 176 |
| Elongation at Break (percent) | 10 | 380 | 410 |
| | 20 | 350 | 320 |
| | 30 | 330 | 300 |
| | 40 | 350 | 300 |

The figures show that both vulcanizates were of good quality, with the vulcanizate from Mix F having slightly superior physical properties to the vulcanizate from Mix E.

*Example 5*

This example illustrates the use of 3,3'-methylenebis(4-ethoxyaniline) as a secondary accelerator with 2(morpholinothio)benzothiazole as the primary accelerator in a cis-1,4-poly-isoprene tire tread stock.

A mixture of the following composition (the figures indicate parts by weight) was compounded on a mill.

Cis-1,4-polyisoprene _____ 100
High abrasion furnace black _____ 50
Zinc oxide _____ 5
Stearic acid _____ 3
Sulfur _____ 2.5
2(morpholinothio)benzothiazole _____ 0.5
3,3'-methylenebis(4-ethoxyaniline) _____ 0.5

Samples of the mixture were cured by heating at 153° C. for various lengths of time, and on testing by standard methods the vulcanizates were found to have the following properties:

| | Cure Time (minutes) | |
|---|---|---|
| Tensile strength (Kg./sq. cm.) | 20 | 223 |
| | 30 | 217 |
| | 40 | 210 |
| Elongation at break (percent) | 20 | 440 |
| | 30 | 430 |
| | 40 | 410 |
| Modulus at 300% Elongation (Kg./sq. cm.) | 20 | 137 |
| | 30 | 143 |
| | 40 | 138 |

The results show that a vulcanizate having good physical properties was obtained at an optimum cure time of 20 minutes. The same system but with the 3,3'-methylene bis(4-ethoxyaniline) omitted would be expected to have an optimum cure time of not less than 25 minutes, thus showing the benefit obtained by using the secondary accelerator.

*Example 6*

This example describes the production of the new compound 3,3'-methylenebis(4-n-heptyloxyaniline).

A solution of 3 grams (0.1 mol.) of paraformaldehyde in 15 cc. of concentrated sulfuric acid was added over a period of 30 minutes at a temperature of 15–20° C. to a stirred mixture containing 41.4 grams (0.2 mol.) of 4-n-heptyloxyaniline, 30 cc. of glacial acetic acid and 70 cc. of concentrated sulfuric acid. The mixture was then diluted with water added at a controlled rate and with cooling so that the temperature did not exceed 25° C. Neutralization with alkali followed by extraction with benzene and removal of the solvent from the benzene extracts gave a residue which was distilled under reduced pressure. 3,3'-methylenebis(4-n-heptyloxyaniline) was obtained as a distillate having a boiling range of 245–255° C. at a pressure of 0.4 mm. of mercury. The distillate subsequently solidified to a solid having a melting point of 40° C. The yield of 3,3'-methylenebis(4-n-heptyloxyaniline) was 15 grams.

It is intended to cover all changes and modifications of the examples of the invention herein chosen for purposes of disclosure which do not constitute departures from the spirit and scope of the invention.

What is claimed is:

1. A process for the vulcanization of a sulfur-vulcanizable rubber, in which an accelerating amount of a 3,3' or 4,4'-methylenebis(aliphatic-oxyaniline) wherein the aliphatic radical is selected from a group consisting of alkyl of 1–10 carbon atoms, lower alkenyl, lower alkoxyalkyl, cyclohexyl and benzyl and wherein the nitrogen valences are satisfied by a member of the group consisting of hydrogen, alkyl of 1–10 carbon atoms, cyclohexyl, benzyl, lower alkoxyalkyl and saturated divalent radicals which with the nitrogen constitute a heterocyclic ring containing at least five but not more than six ring members, is incorporated in the rubber together with a sulfur vulcanizing agent, and the mixture heated to effect vulcanization.

2. A process for the vulcanization of a sulfur-vulcanizable rubber, in which an accelerating amount of 4,4'-methylenebis(2-alkoxyaniline) wherein the alkyl radical contains 1–10 carbon atoms is incorporated in the rubber together with a sulfur vulcanizing agent, and the mixture heated to effect vulcanization.

3. A process for the vulcanization of a sulfur-vulcanizable rubber, in which an accelerating amount of 3,3'-methylenebis(4-alkoxyaniline) wherein the alkyl radical contains 1–10 carbon atoms is incorporated in the rubber together with a sulfur vulcanizing agent and the mixture heated to effect vulcanization.

4. A process for the vulcanization of a sulfur-vulcanizable rubber, in which an accelerating amount of 3,3'-methylenebis(2-alkoxyaniline) wherein the alkyl radical contains 1–10 carbon atoms is incorporated in the rubber together with a sulfur vulcanizing agent and the mixture heated to effect vulcanization.

5. A process for the vulcanization of a sulfur-vulcanizable rubber, in which an accelerating amount of 3,3'-methylenebis(4-methoxyaniline) is incorporated in the rubber together with a sulfur vulcanizing agent and the mixture heated to effect vulcanization.

6. A process for the vulcanization of a sulfur-vulcanizable rubber, in which an accelerating amount of 3,3'-methylenebis(4-ethoxyaniline) is incorporated in the rubber together with a sulfur vulcanizing agent and the mixture heated to effect vulcanization.

7. A process for the vulcanization of a sulfur-vulcanizable rubber, in which from about 0.1 to 1.0 part by weight per hundred parts by weight of rubber of a 3,3' or 4,4'-methylenebis(aliphatic-oxyaniline) wherein the aliphatic radical is selected from a group consisting of alkyl of 1–10 carbon atoms, lower alkenyl, lower alkoxyalkyl, cyclohexyl and benzyl and wherein the nitrogen valences are satisfied by a member of the group consisting of hydrogen, alkyl of 1–10 carbon atoms, cyclohexyl, benzyl, lower alkoxyalkyl and saturated divalent radicals which with the nitrogen constitute a heterocyclic ring containing at least five but not more than six ring members, and from about 0.2 to 2.0 parts by weight per hundred parts by weight of rubber of a thiazole accelerator are incorporated in the rubber together with a sulfur vulcanizing agent, and the mixture heated to effect vulcanization.

8. A composition comprising an unvulcanized sulfur-vulcanizable rubber and an accelerating amount of a 3,3' or 4,4'-methylenebis(aliphatic-oxyaniline) wherein the aliphatic radical is selected from a group consisting of alkyl of 1–10 carbon atoms, lower alkenyl, lower alkoxyalkyl, cyclohexyl and benzyl and wherein the nitrogen valences are satisfied by a member of the group consisting of hydrogen, alkyl of 1–10 carbon atoms, cyclohexyl, benzyl, lower alkoxyalkyl and saturated divalent radicals which with the nitrogen constitute a heterocyclic ring containing at least five but not more than six ring members.

9. A composition comprising an unvulcanized sulfur-vulcanizable rubber and from about 0.1 to 1.0 part by weight per hundred parts by weight of rubber of a 3,3' or 4,4'-methylenebis(aliphatic-oxyaniline) wherein the aliphatic radical is selected from a group consisting of alkyl of 1–10 carbon atoms, lower alkenyl, lower alkoxyalkyl, cyclohexyl and benzyl and wherein the nitrogen valences are satisfied by a member of the group consisting of hydrogen, alkyl of 1–10 carbon atoms, cyclohexyl, benzyl, lower alkoxyalkyl and saturated divalent radicals which with the nitrogen constitute a heterocyclic ring containing at least five but not more than six ring members, and from about 0.2 to 2.0 parts by weight per hundred parts by weight of rubber of a thiazole accelerator.

References Cited by the Examiner

UNITED STATES PATENTS

| | | | |
|---|---|---|---|
| 1,906,938 | 5/1933 | Ter Horst | 260—795 |
| 1,906,939 | 5/1933 | Ter Horst | 260—795 |
| 2,704,752 | 3/1955 | Mathes et al. | 260—795 |

JOSEPH L. SCHOFER, *Primary Examiner.*

D. K. DENENBERG, *Assistant Examiner.*